United States Patent [19]

Dietzsch et al.

[11] Patent Number: 5,625,488
[45] Date of Patent: Apr. 29, 1997

[54] TELECENTRIC RELAY LENS SYSTEM

[75] Inventors: Christa Dietzsch; Eberhard Dietzsch, both of Jena, Germany

[73] Assignee: ETB Endoskopische Technik GmbH Berlin, Berlin, Germany

[21] Appl. No.: 516,224

[22] Filed: Aug. 17, 1995

[30] Foreign Application Priority Data

Aug. 18, 1994 [DE] Germany ............ 44 29 194.9

[51] Int. Cl.$^6$ .................. G02B 9/34; G02B 21/02
[52] U.S. Cl. ............ 359/435; 359/362; 359/434
[58] Field of Search .................. 359/362, 423, 359/434, 435, 733–736, 754, 796–798

[56] References Cited

U.S. PATENT DOCUMENTS

| | | | |
|---|---|---|---|
| 4,025,155 | 5/1977 | Imai | 359/435 |
| 4,353,624 | 10/1982 | Yonekubo | 359/434 |
| 4,575,195 | 3/1986 | Hoogland | 359/435 |
| 5,142,410 | 8/1992 | Ono et al. | 359/435 |
| 5,369,525 | 11/1994 | Bah et al. | 359/435 |
| 5,461,509 | 10/1995 | Canzek | 359/435 |
| 5,519,532 | 5/1996 | Broome | 359/435 |

FOREIGN PATENT DOCUMENTS

| | | | |
|---|---|---|---|
| 2305473 | 8/1974 | Germany | 359/435 |
| 2315941 | 11/1975 | Germany | 359/435 |
| 284142A7 | 11/1990 | Germany . | |

*Primary Examiner*—Thong Nguyen
*Attorney, Agent, or Firm*—Jordan and Hamburg

[57] ABSTRACT

A telecentric relay lens system is provided with field lenses in the vicinity of an object and an image, respectively, at both sides of a centrally arranged lens member. In order to produce distortion the field lenses include cemented surfaces, the cemented surface of one of the field lenses being a collective surface, the cemented surface of the other of the field lenses, being oppositely arranged relative to the central lens member, being a diverging surface.

11 Claims, 3 Drawing Sheets

TELECENTRIC RELAY LENS SYSTEM

BACKGROUND OF THE INVENTION

The invention relates to a telecentric relay lens system, particular for producing intermediate images in endoscopes. The relay lens system comprises a centrally arranged collective lens member and, on both sides of said collective lens member collective field lenses in the vicinity of an object and of an image, respectively.

Relay lens systems are employed in various devices such as endoscopes, periscopes and telescopes to obtain a considerable length in relation to the diameter. In order to enable a linking of such relay lens systems a telecentric pupil position is required on both sides of a centrally arranged collective lens member. Such relay lens systems for unique magnification are in optically ideal cases also called nodal point systems. These are required to produce images of the intermediate images which are substantially free of aberrations.

Known relay lens systems have a symmetrical or substantially symmetrical setup. Conventionally, they consist of a central optical system, which may be an achromat (as disclosed in the U.S. Pat. No. 4,025,155) or, when higher quality is required and as disclosed in the DD-PS 284 142, Table 3, a double-Gauss lens and of identical field lenses on both sides (side lenses) which converge the principle path of rays for producing telecentry and which are arranged in the vicinity of the object and the image. The field lenses have focal lengths of half the transmission length and, therefore, are of low power.

Previous relay lens systems are without any distortion due to their symmetrical or substantially symmetrical setup. Due to the telecentry and the extremely low inclination of the principle rays resulting therefrom it is not feasible to obtain any distortion worth mentioning by use of the known means, for example by bending of the field lenses.

However, the distortion, of such relay lens systems is desired for some applications, e.g. in order to compensate the basic distortion of the fronted-objective in endoscopes.

SUMMARY OF THE INVENTION

It is an object of the present invention to provide a relay lens system producing distortion.

According to the invention the object is realized in that one of the field lenses includes a collective cemented surface and the other of said field lenses, being oppositely positioned relative to said centrally arranged collective lens member, includes a diverging cemented surface. In a telecentric ray path, a cemented surface introduced in a field lens produces the desired effect on the distortion by a corresponding index break and by great angles of incidence and refraction. Especially, a dispersive cemented surface, that is an interface of negative power in the image side field lens, produces a positive (pincushion) distortion, and correspondingly, a collecting cemented surface, that is an interface of positive power in the image side field lens produces negative (barrel) distortion. The opposite distortion effect is obtained by such a cemented surface in the object side field lens. A distinct distortion, however, is only obtained by a high effect of such cemented surfaces, i.e. when there is an index break of at least 0.15, and a strong bended interface.

The cemented surfaces of the field lenses also involve, to a low degree, other image errors. It is, however, feasible to compensate them by suitable means. For example, a diverging cemented surface in the image side field lens produces positive coma (external coma) and a positive field curvature. A collecting cemented surface in the image side field lens produces negative coma (internal coma) and a negative field curvature. Analogous cemented surfaces in the object side field lens produce the same effect as concerns the symmetrical image aberrations, whereas, as concerns the non-symmetrical image aberrations (coma and distortion), the effect is reversed and, hence, compensated. The portions of the co-resulting aberrations (coma and image field curvature) depend on the arrangement of the cemented faces in the field lenses. These are, for example, lower when the shapes of the cemented surfaces are convex to the central member.

The very gist of the invention consists in providing a strongly diverging cemented surface in the image side field lens and a strong collective cemented surface in the object side field lens, in order to obtain, for example, a positive distortion. Thus, the effect upon the image field curvature is automatically compensated whereas the effects concerning distortion are added. The final distortion is in approximation a quadratic function of the image field diameter. The still remaining coma is corrected by slightly changing the construction parameters of the centrally positioned collective lens member. This can be achieved, for example, by bending a single achromat or, at comparatively low expenditures, by non-symmetrical alteration of air spaces in case the centrally arranged collective lens member is a Gauss lens type. In this case, the individual lens elements and members of the Gauss lens are maintained in symmetry.

The invention will be explained in more detail hereinafter by means of example of four embodiments. Equal reference numerals refer to equal Figures and respective Tables.

DETAILED DESCRIPTION OF THE INVENTION

In the following FIGS. 1 to 4 and in the corresponding Tables 1 to 4, the object side field lenses contain a collecting interface, whereas the image side field lenses contain a diverging interface. This arrangement of a high asymmetry of the field lenses with respect to their common central lens member produces a positive (pincushion) distortion.

Figure 1:
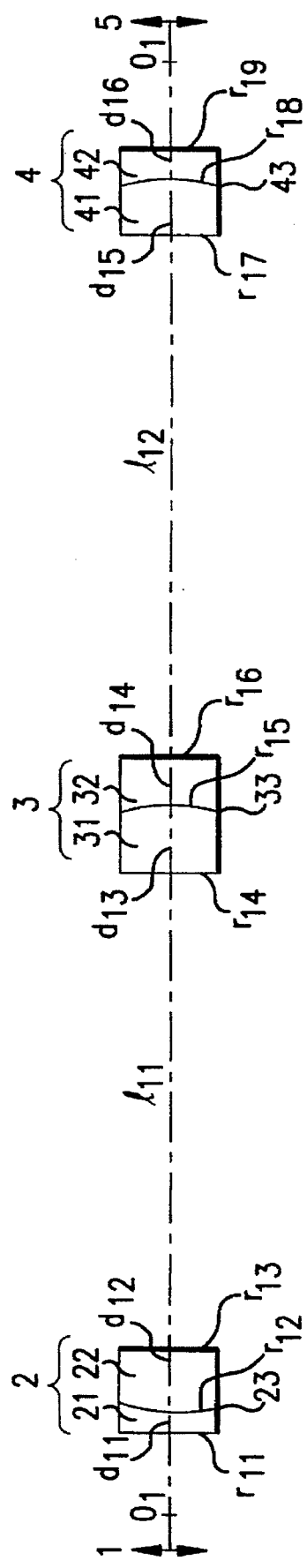
FIG. 1 shows a relay lens system specified in Table 1 in which the central lens member consists of a single achromat and in which the curvatures of the cemented surfaces of both the field lenses to the central lens member are concave.

In FIG. 1 and Table 1 an object 1, a first field lens 2, a central collective lens member 3, a second field lens 4 and an image 5 are arranged about an optical axis $0_1$—$0_1$, said image being produced from the object 1 by means of the telecentric relay lens system 2, 3, 4. The first field lens 2 is comprised of a low index concave lens element 21 and a high-index convex lens elements 22. Both these lens elements are connected by a cemented surface 23, which has positive power. The corresponding radii are $r_{11}$, $r_{12}$ and $r_{13}$ and the thicknesses are of $d_{11}$ and $d_{12}$. The central lens member 3 is a conventional achromat, arranged at a distance $l_{11}$ relative to the field lens 2 and is provided on respective sides of a cemented surface 33 with a low-index biconvex lens element 31 and with a higher-index convex-concave lens element 32. The corresponding radii and thicknesses are $r_{14}$, $r_{15}$, $r_{16}$, $d_{13}$ and $d_{14}$, respectively. The second field lens 4 is arranged at a distance $l_{12}$ relative to the central lens member 3, said second field lens 4 consists of a low-index biconvex lens 41 and a high-index convex-concave lens 42, both having a cemented surface 43 in common, which is of negative power, and having respective radii $r_{17}$, $r_{18}$ and $r_{19}$ and thicknesses $d_{15}$ and $d_{16}$.

Both the highly collective cemented face 23 and the highly diverging cemented face 43 are concave in opposition to the central lens member 3. The latter exhibits a stronger bending than conventional achromats for a unique magnification and, hence, has a strong isoplanasie aberration for compensating coma of the entire system 2, 3 and 4. An aplanat, i.e. a coma-free lens, for unique magnification would have the analogous radii $r_{14}=+39.2$, $r_{15}=-7.2$ and $r_{16}=-20.7$ when using the same glass.

The relay system according to FIG. 1 has an aperture of about 0.07, a paraxial magnification of 0.986, an object distance of $s=-7.84$, back focus distance of $s'=+8.00$, and, at a normalized object-to-image distance of 100, a distortion of about 1.8% at a field diameter of 4.0.

TABLE 1

| Optical elements | radii | Thicknesses and air spaces | refractive indices | Abbe-v-numbers |
| --- | --- | --- | --- | --- |
| 21 | $r_{11} = \infty$ | $d_{11} = 1.25$ | 1.5848 | 40.6 |
|  | $r_{12} = +8.11$ |  |  |  |
| 22 |  | $d_{12} = 4.59$ | 1.7923 | 47.2 |
|  | $r_{13} = \infty$ |  |  |  |
|  |  | $l_{11} = 31.06$ |  |  |
|  | $r_{14} = +21.76$ |  |  |  |
| 31 |  | $d_{13} = 4.54$ | 1.6557 | 44.6 |
|  | $r_{15} = -7.86$ |  |  |  |
| 32 |  | $d_{14} = 3.00$ | 1.7343 | 28.2 |
|  | $r_{16} = -34.36$ |  |  |  |
|  |  | $l_{12} = 33.88$ |  |  |
|  | $r_{17} = +14.70$ |  |  |  |
| 41 |  | $d_{15} = 3.84$ | 1.5749 | 57.3 |
|  | $r_{18} = -8.11$ |  |  |  |
| 42 |  | $d_{16} = 2.00$ | 1.7923 | 47.2 |
|  | $r_{19} = -47.70$ |  |  |  |

Figure 2:
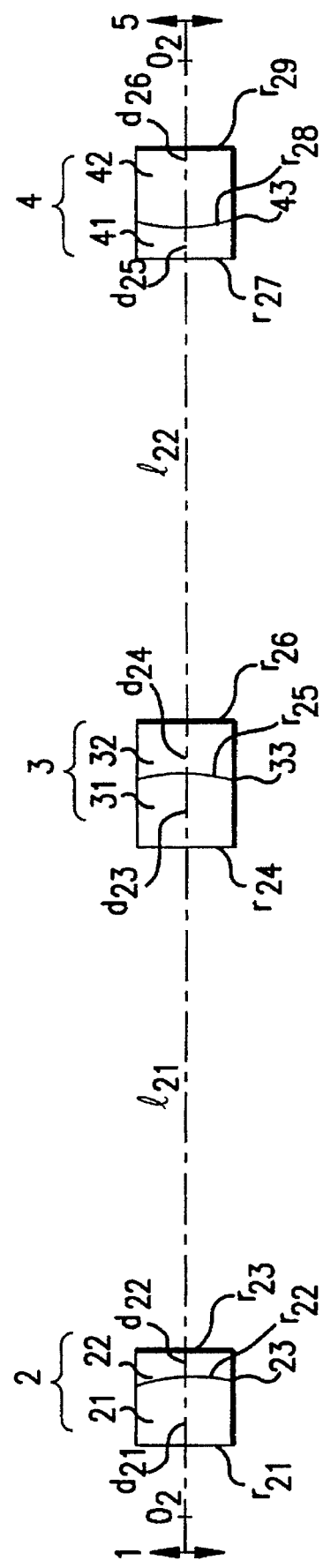
FIG. 2 shows a relay lens system specified in Table 2 and of the same kind as in FIG. 1, in which the curvatures of the cemented surfaces of both the field lenses to the central lens member are convex.

The telecentric relay system according to FIG. 2 and Table 2 is constructed in analogy to FIG. 1. About an optical axis $0_2$—$0_2$ an object 1, a first bipartite field lens 2, a bipartite central lens member 3 in the shape of an achromat, a second bipartite field lens 4 and an image 5 are arranged successively. The designations for the optical elements, the lens radii $r_i$, the lens thicknesses $d_i$, the air spaces $l_i$ are identical to that described in FIG. 1. In contrast to FIG. 1 the cemented surfaces 23 and 43 of the field lenses 2 and 4, respectively, are convex to the central lens member 3, the lens 21 is convex and made of high index glass, the lens element 42 is also convex but made of low index glass, the lenses 22 and 41 are concave. In particular, the cemented surface 43 of the image side field lens is more strongly curved than in FIG. 1. Also in this case, the centrally arranged achromat 3 exhibits a stronger bending than a conventional achromat for unique magnification and, hence, involves a weak coma term for compensating coma for the entire relay system. The bending, however, is lower than that in FIG. 1. The optical relay lens system according to FIG. 2 has an aperture of about 0.07, a paraxial magnification of 0.982, an object distance of $s=-7.63$, back focus distance of $s'=+7.31$, a distortion of about 2.4% at a standardized object-to-image distance of 100 and at a field diameter of 4.0.

| Optical elements | radii | Thicknesses and air spaces | refractive indices | Abbe-v-numbers |
| --- | --- | --- | --- | --- |
|  | $r_{21} = -660.00$ |  |  |  |
| 21 | $d_{21} = 4.8$ | 1.7923 | 47.2 |  |
|  | $r_{22} = -7.12$ |  |  |  |
| 22 |  | $d_{22} = 1.62$ | 1.5848 | 40.6 |
|  | $r_{23} = \infty$ |  |  |  |
|  |  | $l_{21} = 33.05$ |  |  |
|  | $r_{24} = +33.20$ |  |  |  |
| 31 |  | $d_{23} = 4.87$ | 1.6864 | 44.2 |
|  | $r_{25} = -7.12$ |  |  |  |
| 32 |  | $d_{24} = 3.25$ | 1.7462 | 28.0 |
|  | $r_{26} = -24.52$ |  |  |  |
|  |  | $l_{22} = 30.18$ |  |  |
|  | $r_{27} = +21.25$ |  |  |  |
| 41 |  | $d_{25} = 1.62$ | 1.7923 | 47.2 |
|  | $r_{28} = +5.54$ |  |  |  |
| 42 |  | $d_{26} = 5.60$ | 1.5821 | 53.4 |
|  | $r_{29} = -21.25$ |  |  |  |

Figure 3:
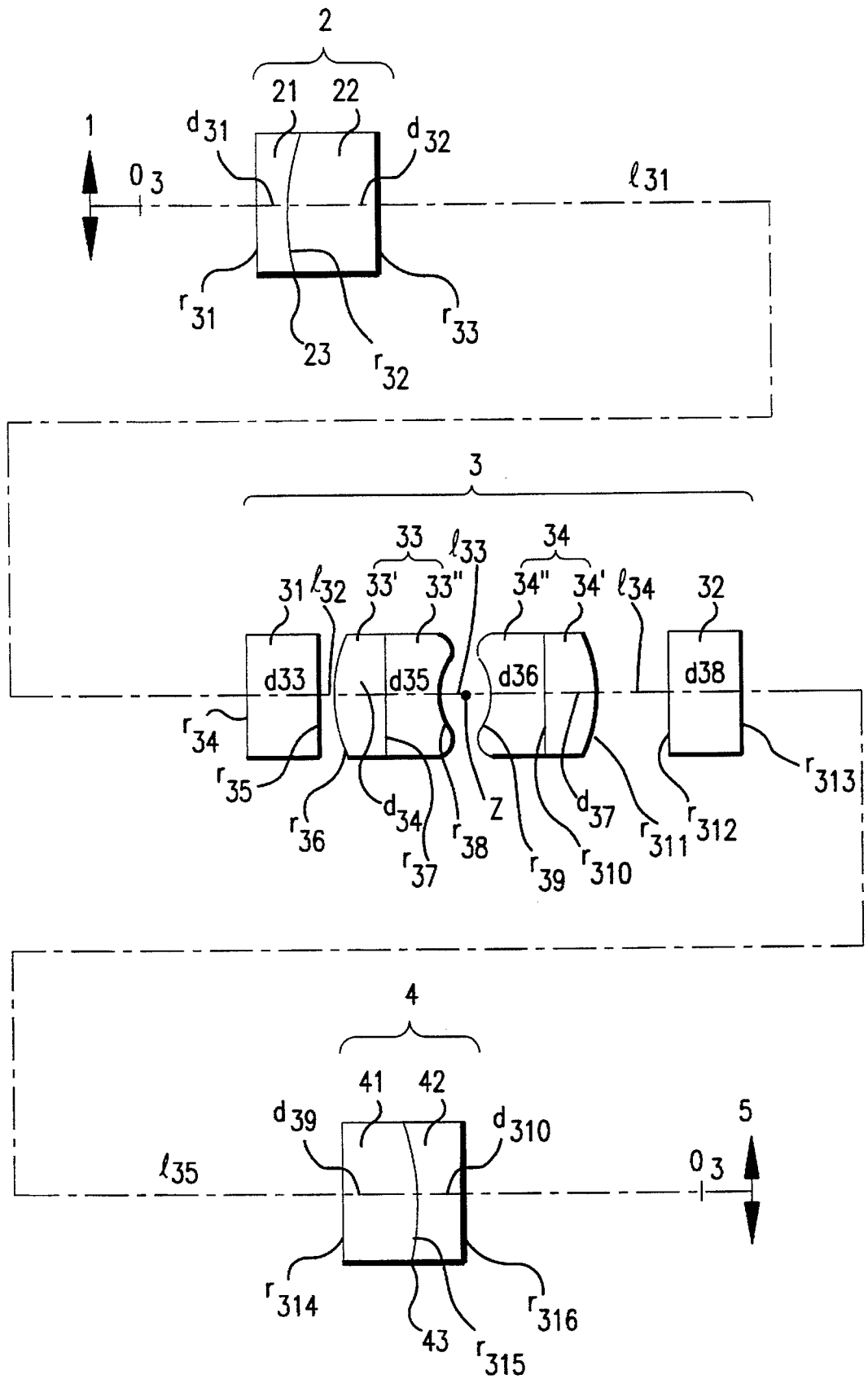
FIG. 3 shows a relay lens system specified in Table 3 in which the central lens member is a double-Gauss-lens and the curvatures of the cemented surfaces of both the field lenses to the central member are concave.

In FIG. 3 and Table 3 a relay lens system is represented, comprising about an optical axis $0_3$—$0_3$ an object 1, an object side field lens 2, a double-Gauss-lens 3, an image side field lens 4 and an image 5. The object side field lens 2 consists of two lens elements, connected via a face 23, a concave lens element 21 of low refractive index and a convex lens element 22 of high refractive index, with corresponding radii $r_{31}$, $r_{32}$ and $r_{33}$ and thicknesses $d_{31}$ and $d_{32}$. The double-Gauss-lens 3 is arranged at a distance $l_{31}$ from the field lens 2 and is symmetrically constructed relative to a center Z. It has on respective sides of said center Z one of collective lens elements 31 and 32, and one of a dispersive members 33 and 34, respectively, which, in turn, are comprised of convex lenses 33' and 34', respectively, and concave lenses 33" and 34", respectively. The corresponding radii, thicknesses, and distances are $r_{34}$ to $r_{313}$, and $d_{33}$ to $d_{38}$, respectively, and $l_{32}$ to $l_{34}$, respectively. At an air space $l_{35}$ from the double-Gauss-lens 3 the image side field lens 4 is arranged and consists of a convex lens element 41 of low refractive index and of a concave lens 42 of high refractive index, both lenses are connected to one another via a cemented surface 43. The radii and thicknesses of the image side field lens are $r_{314}$, $r_{315}$, $r_{316}$ and $d_{39}$ and $d_{310}$, respectively. Thus, the cemented surface 23 of the object side field lens 2 is rendered strongly collecting and the cemented face 43 of the image side field lens 4 strongly diverging. Both the interfaces are concave in opposition to the double-Gauss-lens 3. The double-Gauss-lens 3 is still symmetrical as concerns the shape of its lens elements and members. The necessary weak coma aberration for eliminating the coma for the entire relay lens system is obtained by a non-symmetrical alteration of the air spaces $l_{32}$ and $l_{34}$. The relay lens system according to FIG. 3 has an aperture of about 0.09, a paraxial magnification of 0.97, an object distance of $s=-4.26$, a back focus distance of $s'=+4.62$, a distortion of about 3.2% at a standardized object-to-image distance of 100 and at a field size of 5.0.

TABLE 3

| Optical elements | radii | Thicknesses and air spaces | refractive indices | Abbe-v-numbers |
|---|---|---|---|---|
| 21 | $r_{31} = -26.50$ | $d_{31} = 0.97$ | 1.5343 | 48.5 |
| 22 | $r_{32} = +7.64$ | $d_{32} = 3.87$ | 1.7206 | 47.7 |
|  | $r_{33} = -56.10$ | $l_{31} = 26.85$ |  |  |
| 31 | $r_{34} = +33.26$ | $d_{33} = 4.17$ | 1.6734 | 46.8 |
|  | $r_{35} = -33.26$ | $l_{32} = 0.82$ |  |  |
| 33' | $r_{36} = +8.983$ | $d_{34} = 2.84$ | 1.6734 | 46.8 |
| 33" | $r_{37} = \infty$ | $d_{35} = 3.08$ | 1.7343 | 28.2 |
|  | $r_{38} = +5.827$ | $l_{33} = 2.76$ |  |  |
| 34" | $r_{39} = -5.827$ | $d_{36} = 3.08$ | 1.7343 | 28.2 |
| 34' | $r_{310} = \infty$ | $d_{37} = 2.84$ | 1.6734 | 46.8 |
|  | $r_{311} = -8.983$ | $l_{34} = 3.74$ |  |  |
| 32 | $r_{312} = +33.26$ | $d_{38} = 4.17$ | 1.6734 | 46.8 |
|  | $r_{313} = -33.26$ | $l_{35} = 27.09$ |  |  |
| 41 | $r_{314} = +51.70$ | $d_{39} = 3.87$ | 1.5498 | 53.3 |
| 42 | $r_{315} = -5.66$ | $d_{310} = 0.97$ | 1.7480 | 44.4 |
|  | $r_{316} = -15.40$ |  |  |  |

Figure 4:
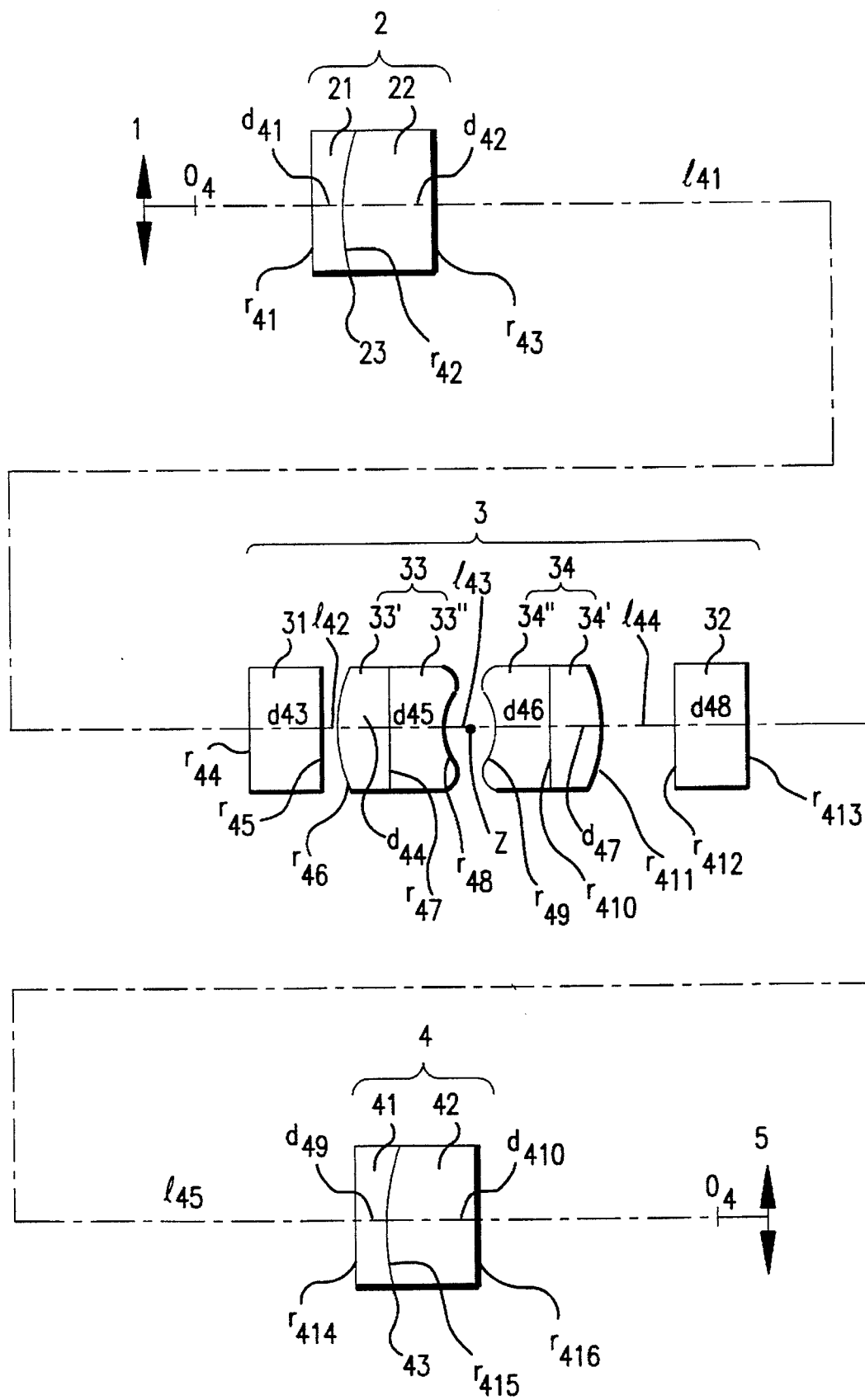
FIG. 4 shows a relay lens system specified in Table 4 and having a basic setup in analogy to FIG. 3, in which the object side field lens is provided with a collective cemented surface concave to the central lens member, and the image side field lens is provided with a dispersive cemented surface convex to the central lens member.

The relay system according to FIG. 4 and Table 4 is constructed in analogy to that in FIG. 3. About an optical axis $O_4$—$O_4$ an object 1, a field lens 2 having a cemented surface 23, a double-Gauss-lens 3 symmetrical with respect to its lens elements and members about a center Z, an image side field lens 4 having a cemented surface 43, and an image 5 are arranged. The lens radii 10 are, as in FIG. 3, $r_i$, the lens thicknesses $d_i$, the air spaces $l_i$, the respective values are given in Table 4. The object side field lens 2 is provided with a strongly collective cemented surface 23 which is concave towards the central lens member 3. The image side field lens 4 has a strongly diverging cemented surface 43 which is convex towards the central lens member 3. The double-Gauss-lens 3 maintains its symmetry as concerns the shape of the lens elements. The effect of eliminating coma for the entire system is obtained by virtue of the non-symmetrical air spaces $l_{42}$ and $l_{44}$. The relay lens system according to FIG. 4 has an aperture of about 0.09, a paraxial magnification of 0.97, an object distance of s=−4.3, an image side back focal distance of s'=+4.67, a distortion of about 3.2% at a standardized object-to-image distance of 100 and at a field size of 5.0.

TABLE 4

| Optical elements | radii | Thicknesses and air spaces | refractive indices | Abbe-v-numbers |
|---|---|---|---|---|
| 21 | $r_{41} = -24.80$ | $d_{41} = 0.98$ | 1.5343 | 48.5 |
| 22 | $r_{42} = +8.02$ | $d_{42} = 3.91$ | 1.7206 | 47.7 |
|  | $r_{43} = -42.60$ | $l_{41} = 25.44$ |  |  |
| 31 | $r_{44} = +34.06$ | $d_{43} = 3.91$ | 1.6734 | 46.8 |
|  | $r_{45} = -34.06$ |  |  |  |

TABLE 4-continued

| Optical elements | radii | Thicknesses and air spaces | refractive indices | Abbe-v-numbers |
|---|---|---|---|---|
|  |  | $l_{42} = 0.85$ |  |  |
| 33' | $r_{46} = +9.065$ | $d_{44} = 2.56$ | 1.6734 | 46.8 |
| 33" | $r_{47} = \infty$ | $d_{45} = 3.48$ | 1.7343 | 28.2 |
|  | $r_{48} = +5.855$ | $l_{43} = 2.18$ |  |  |
| 34" | $r_{49} = -5.855$ | $d_{46} = 3.48$ | 1.7343 | 28.2 |
| 34' | $r_{410} = \infty$ | $d_{47} = 2.56$ | 1.6734 | 46.8 |
|  | $r_{411} = -9.065$ | $l_{44} = 3.91$ |  |  |
| 32 | $r_{412} = +34.06$ | $d_{48} = 3.91$ | 1.6743 | 46.8 |
|  | $r_{413} = -34.06$ | $l_{45} = 28.98$ |  |  |
| 41 | $r_{414} = +12.32$ | $d_{49} = 1.17$ | 1.7480 | 44.4 |
| 42 | $r_{415} = +5.11$ | $d_{410} = 3.71$ | 1.5421 | 59.4 |
|  | $r_{416} = -146.00$ |  |  |  |

When heretofore and hereinafter reference is made to a cemented surface 23 and 43, respectively, of the object side and image side, respectively, lenses 2 and 4, respectively, this includes the feasibility of wringing and of a minute air space, respectively.

By a multiple use of the invention in endoscopic or similar optical system distortion compensations on an order of size of 10% are attainable.

| LIST OF REFERENCE NUMERALS | |
|---|---|
| 1 | object |
| 2, 4 | field lens |
| 3 | central lens member |
| 5 | image |
| 21, 22, 41, 42 | lenses |
| 23, 33, 43 | cemented faces |
| 31 | biconvex lens |
| 32 | convex-concave lens |
| 33', 34' | convex lenses |
| 33", 34" | concave lenses |
| Z | center |
| $O_i$—$o_i$ | optical axes |
| $r_i$ | lens radii |
| $d_i$ | lens thicknesses |
| $l_i$ | air spaces |

We claim:

1. A telecentric relay lens system comprising:
   a centrally arranged asymmetric collective lens member and, on both sides of said collective lens member, field lenses in the vicinity of an object and of an image, respectively;
   one of said field lenses including collective cemented surfaces: and
   another of said field lenses, being oppositely arranged relative to said central lens member, including diverging cemented surfaces.

2. Telecentric relay lens system as claimed in claim 1, wherein the difference of the refractive index at the cemented surface in each of said field lenses is at least 0.15.

3. Telecentric relay lens system as claimed in claim 2, wherein both the cemented surfaces of said field lenses are formed concave to the central lens member.

4. Telecentric relay lens system as claimed in claim 2, wherein both the cemented surfaces of said field lenses are formed convex to the central lens member.

5. Telecentric relay lens system as claimed in claims 3 or 4, wherein said central lens member is an achromat.

6. Telecentric relay lens system as claimed in claims 3 or 4, wherein the central lens member is a double-Gauss-lens being symmetrical as concerns its lens elements and non-symmetrical as concerns its air spaces.

7. Telecentric relay lens system as claimed in claim 5, characterized by the following construction elements:

| Optical elements | radii | Thicknesses and air spaces | refractive indices | Abbe-v-numbers |
|---|---|---|---|---|
| 21 | $r_{11} = \infty$ | $d_{11} = 1.25$ | 1.5848 | 40.6 |
|  | $r_{12} = +8.11$ |  |  |  |
| 22 |  | $d_{12} = 4.59$ | 1.7923 | 47.2 |
|  | $r_{13} = \infty$ |  |  |  |
|  |  | $l_{11} = 31.06$ |  |  |
|  | $r_{14} = +21.76$ |  |  |  |
| 31 |  | $d_{13} = 4.54$ | 1.6557 | 44.6 |
|  | $r_{15} = -7.86$ |  |  |  |
| 32 |  | $d_{14} = 3.00$ | 1.7343 | 28.2 |
|  | $r_{16} = -34.36$ |  |  |  |
|  |  | $l_{12} = 33.88$ |  |  |
|  | $r_{17} = +14.70$ |  |  |  |
| 41 |  | $d_{15} = 3.84$ | 1.5749 | 57.3 |
|  | $r_{18} = -8.11$ |  |  |  |
| 42 |  | $d_{16} = 2.00$ | 1.7923 | 47.2 |
|  | $r_{19} = -47.70.$ |  |  |  |

8. Telecentric relay lens system as claimed in claim 5, characterized by the following construction elements:

| Optical element | radii | Thicknesses and air space | refractive indices | Abbe-v-numbers |
|---|---|---|---|---|
|  | $r_{21} = -660.00$ |  |  |  |
| 21 |  | $d_{21} = 4.87$ | 1.7923 | 47.2 |
|  | $r_{22} = -7.12$ |  |  |  |
| 22 |  | $d_{22} = 1.62$ | 1.5848 | 40.6 |
|  | $r_{23} = \infty$ |  |  |  |
|  |  | $l_{21} = 33.05$ |  |  |
|  | $r_{24} = +33.20$ |  |  |  |
| 31 |  | $d_{23} = 4.87$ | 1.6864 | 44.2 |
|  | $r_{25} = -7.12$ |  |  |  |
| 32 |  | $d_{24} = 3.25$ | 1.7462 | 28.0 |
|  | $r_{26} = -24.52$ |  |  |  |
|  |  | $l_{22} = 30.18$ |  |  |
|  | $r_{27} = +21.25$ |  |  |  |
| 41 |  | $d_{25} = 1.62$ | 1.7923 | 47.2 |
|  | $r_{28} = +5.54$ |  |  |  |
| 42 | $d_{26} = 5.60$ | 1.5821 | 53.4 |
|  | $r_{29} = -21.25.$ |  |  |  |

9. Telecentric relay lens system as claimed in claim 6, characterized by the following construction elements:

| Optical elements | radii | Thicknesses and air spaces | refractive indices | Abbe-v-numbers |
|---|---|---|---|---|
| 21 |  | $d_{31} = 0.97$ | 1.5343 | 48.5 |
|  | $r_{32} = +7.64$ |  |  |  |
| 22 |  | $d_{32} = 3.87$ | 1.7206 | 47.7 |
|  | $r_{33} = -56.10$ |  |  |  |
|  |  | $l_{31} = 26.85$ |  |  |
|  | $r_{34} = +33.26$ |  |  |  |
| 31 |  | $d_{33} = 4.17$ | 1.6734 | 46.8 |
|  | $r_{35} = -33.26$ |  |  |  |
|  |  | $l_{32} = 0.82$ |  |  |
|  | $r_{36} = +8.983$ |  |  |  |
| 33' |  | $d_{34} = 2.84$ | 1.6734 | 46.8 |
|  | $r_{37} = \infty$ |  |  |  |
| 33" |  | $d_{35} = 3.08$ | 1.7343 | 28.2 |
|  | $r_{38} = +5.827$ |  |  |  |
|  |  | $l_{33} = 2.76$ |  |  |
| $r_{39} = -5.827$ |  |  |  |  |
| 34" |  | $d_{36} = 3.08$ | 1.7343 | 28.2 |
|  | $r_{310} = \infty$ |  |  |  |
| 34' |  | $d_{37} = 2.84$ | 1.6734 | 46.8 |
|  | $r_{311} = -8.983$ |  |  |  |
|  |  | $l_{34} = 3.74$ |  |  |
| 32 |  | $d_{38} = 4.17$ | 1.6734 | 46.8 |
|  | $r_{313} = -33.26$ |  |  |  |
|  |  | $l_{35} = 27.09$ |  |  |
|  | $r_{314} = +51.70$ |  |  |  |
| 41 |  | $d_{39} = 3.87$ | 1.5498 | 53.3 |
|  | $r_{315} = -5.66$ |  |  |  |
| 42 |  | $d_{310} = 0.97$ | 1.7480 | 44.4 |
|  | $r_{316} = -15.40.$ |  |  |  |

10. Telecentric relay lens system as claimed in claim 6, characterized by the following construction elements:

| Optical elements | radii | Thicknesses and air spaces | refractive indices | Abbe-v-numbers |
|---|---|---|---|---|
|  | $r_{41} = -24.80$ |  |  |  |
| 21 |  | $d_{41} = 0.98$ | 1.5343 | 48.5 |
|  | $r_{42} = +8.02$ |  |  |  |
| 22 |  | $d_{42} = 3.91$ | 1.7206 | 47.7 |
|  | $r_{43} = -42.60$ |  |  |  |
|  |  | $l_{41} = 25.44$ |  |  |
|  | $r_{44} = +34.06$ |  |  |  |
| 31 |  | $d_{43} = 3.91$ | 1.6734 | 46.8 |
|  | $r_{45} = -34.06$ |  |  |  |
|  |  | $l_{42} = 0.85$ |  |  |
|  | $r_{46} = +9.065$ |  |  |  |
| 33' |  | $d_{44} = 2.56$ | 1.6734 | 46.8 |
|  | $r_{47} = \infty$ |  |  |  |
| 33" |  | $d_{45} = 3.48$ | 1.7343 | 28.2 |
|  | $r_{48} = +5.855$ |  |  |  |
|  |  | $l_{43} = 2.18$ |  |  |
|  | $r_{49} = -5.855$ |  |  |  |
| 34" |  | $d_{46} = 3.48$ | 1.7343 | 28.2 |
|  | $r_{410} = \infty$ |  |  |  |
| 34' |  | $d_{47} = 2.56$ | 1.6734 | 46.8 |
|  | $r_{411} = -9.065$ |  |  |  |
|  |  | $l_{44} = 3.91$ |  |  |
|  | $r_{412} = +34.06$ |  |  |  |
| 32 | $d_{48} = 3.91$ | 1.6743 | 46.8 |
|  | $r_{413} = -34.06$ |  |  |  |
|  |  | $l_{45} = 28.98$ |  |  |
|  | $r_{414} = +12.32$ |  |  |  |
| 41 |  | $d_{49} = 1.17$ | 1.7480 | 44.4 |
|  | $r_{415} = +5.11$ |  |  |  |
| 42 |  | $d_{410} = 3.71$ | 1.5421 | 59.4 |
|  | $r_{416} = -146.00.$ |  |  |  |

11. A telecentric relay lens system comprising:
a centrally arranged asymmetric collective lens member and, on both sides of said collective lens member, field lenses in the vicinity of an object and of an image, respectively;
one of said fields lenses including collective cemented surfaces;
another of said field lenses, being oppositely arranged relative to said central lens member, including diverging cemented surfaces; and
one of said cemented surfaces included in said field lenses being formed concave to the central lens member and the other of said cemented surfaces included in said field lenses being formed convex to the central lens member.

* * * * *